Nov. 18, 1947.  G. P. HEIGLE  2,431,118
IMPLEMENT HOLDER
Filed May 22, 1946
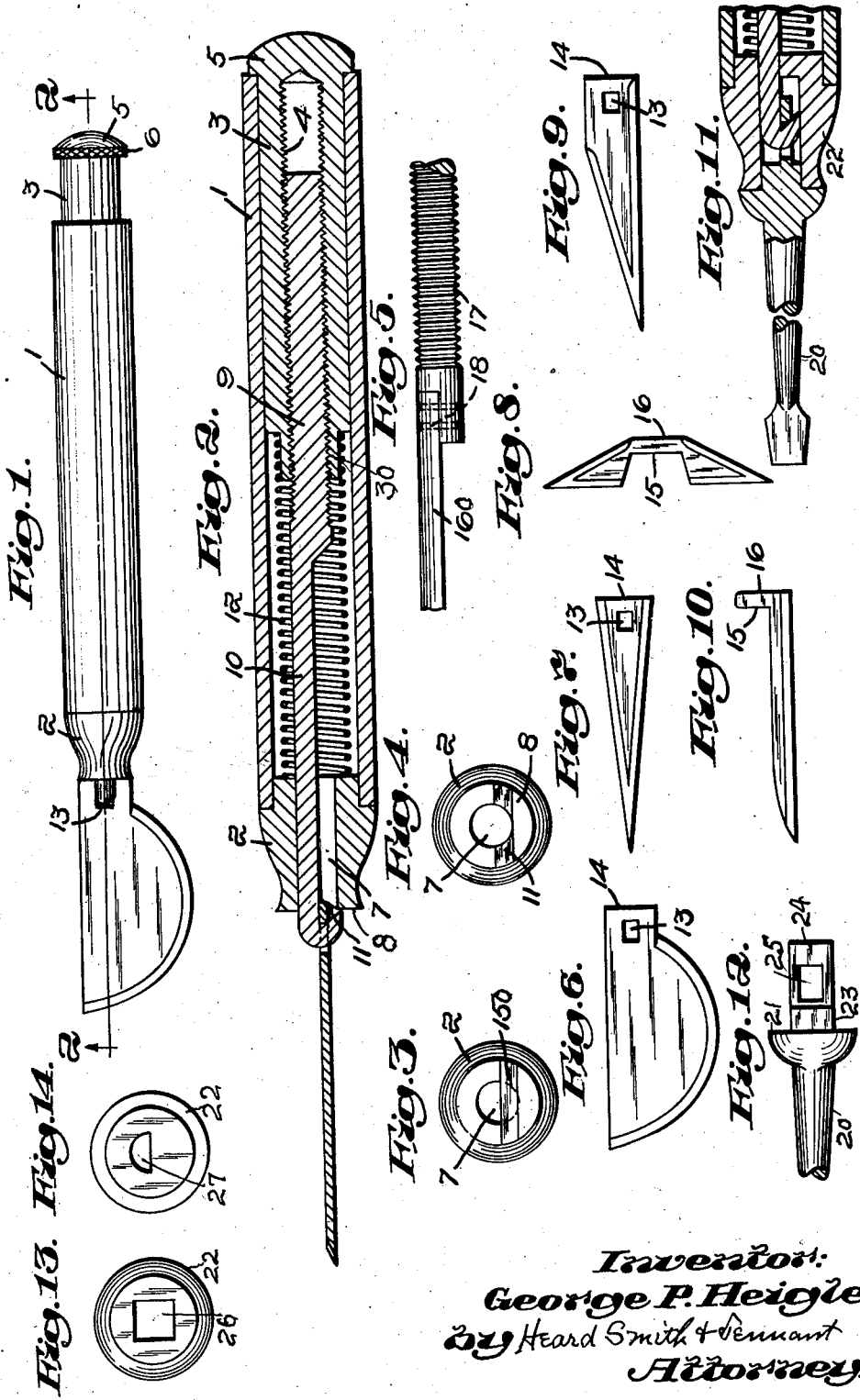
Inventor:
George P. Heigle,
by Heard Smith & Tennant
Attorneys Patented Nov. 18, 1947

2,431,118

UNITED STATES PATENT OFFICE 2,431,118

IMPLEMENT HOLDER

George P. Heigle, Boston, Mass.

Application May 22, 1946, Serial No. 671,637

7 Claims. (Cl. 279—53)

This invention relates to an implement holder adaptable to a wide variety of implements such as thin cutter blades employed in surgery, in the manufacture of shoes, in wood carving, in whittling, in modeling and for various other purposes and also adaptable to a wide variety of implements or tools such as screw drivers, files, putty knives and other implements purposely constructed to fit the holder.

The object of the invention is to provide such a holder to which any one of a variety of such implements or tools may be quickly fitted and firmly and securely held, thus enabling the different implements conveniently to be substituted one for the other as the various operations may require, and at the same time holding the attached implement properly positioned and rigidly secured in place.

The nature and purpose of the invention will appear more fully from the accompanying description and drawings and will be particularly pointed out in the claims.

The drawings illustrate preferred embodiments of the invention together with examples adaptable thereto.

In the drawings:

Fig. 1 is a side elevation of one form of holder with one form of thin blade in place and prior to the parts being brought into implement locking position.

Fig. 2 is a view in longitudinal cross section of the construction shown in Fig. 1.

Fig. 3 is an end view of the holder showing a slightly different form.

Fig. 4 is an end view of the holder shown in Figs. 1 and 2.

Fig. 5 is a detail of a plunger construction of the form adapted to go with a holder having the end construction shown in Fig. 3.

Figs. 6 to 10 inclusive illustrate some of the implements in the form of types of thin blades for surgical and other purposes adaptable for use with the holder.

Fig. 11 is a view partially in longitudinal cross section of the end of a holder adaptable for holding a tool such as a screw driver purposely constructed to fit the holder.

Fig. 12 is a view of the end of the tool shown in Fig. 11 taken at right angles to the position in Fig. 11.

Fig. 13 is an end view of the holder shown in Fig. 11.

Fig. 14 is a view of the inner end of the plug shown in Fig. 11.

The holder in the form shown in Figs. 1 and 2 comprises a tubular handle 1 of suitable diameter and length to be grasped and held by the hand of the operator. This tubular handle has at its outer end a preferably removable tubular plug 2 tightly fitting the tubular portion 1 so as to be rigid therewith. These parts may be made of metal, plastic, or any suitable material.

A sleeve 3 provided with a threaded bore 4 has a telescoping fit within the handle and is provided with a closed end 5 extending over and adapted to abut against the end of the handle 1. The periphery of this closed end 5 is desirably knurled at 6. The plug 2 which closes the opposite end of the handle is provided with a bore 7 extending longitudinally therethrough, and at its outer end 8 is provided with a transverse groove 11 as shown in Fig. 4.

A plunger is located in the handle and has at one end a cylindrical threaded shank portion 9 co-operating with the threaded bore 4 of the sleeve 3 and a semi-cylindrical shank portion 10 extending from the threaded shank portion 9 out through the bore 7 of the plug 2, and at its outer end is hook shaped with the face of the hook extending in a bevel from the flat face of the shank portion. This plunger is preferably made of metal, but it and the sleeve 3 may be made of plastic or other suitable material.

An expansion spring 12 is located within the tubular handle, abuts at one end the inner end of the plug 2, and at the opposite end abuts the sleeve 3 and extends over and is centered by the shouldered portion 30 of the sleeve.

Examples of some of the implements in the form of thin cutter blades to which the holder is adaptable are shown in Figs. 6, 7, and 9. These implements are each provided with a hole 13 through which the hook of the plunger may pass and the straight edge 14 adapted to seat in the transverse groove 11 in the end of the plug 2. Other examples of implements with which the holder is adapted to co-operate are shown in Figs. 8 and 10 and in this case are provided with an edge portion 15 to be engaged by the hook or the plunger and a straight edge 16 adapted to seat in the transverse groove 11 of the plug 2.

In the operation of the holder, the sleeve 3 is unscrewed with respect to the plunger so that the end of the sleeve projects well out from the tubular portion 1 of the handle as shown in Fig. 1. Then by pressing the sleeve inward, the spring 12 is compressed and the hook of the plunger is projected out through the plug 2. This enables the implement to be engaged by the hook. Then upon release of the sleeve, the spring 12 expands forcing the sleeve outward and causing the hook to draw the blade down into its seat in the transverse groove 11 as shown in Fig. 1. The face of the hook and the face of the groove 11 are beveled toward each other from the flat face of the plunger and thus the tendency is to force the blade against the flat face of the plunger thereby properly positioning the blade in place. Then by screwing up the sleeve until its closed end 5 firmly abuts the end of the tubular handle 1, as shown in Fig. 2, the blade is rigidly locked in position.

For some purposes and with some sizes of the device it is desirable that the beveled side wall of the groove in which the straight edged end of the implement seats shall be continuous, and for that purpose this wall is formed as shown in Fig. 3 upon a separate piece 150 as an inset in the end of the plug 2. This inset may be secured in place after the parts are assembled or it may first be permanently secured in place, and when this is done, the plunger is preferably made in two parts as shown in Fig. 5. With the semi-cylindrical shank portion 160 secured to the cylindrical threaded shank portion 17 in any suitable manner as by the pins 18. This enables the shank portion 160 to be inserted through the plug 2 then secured to the threaded shank portion and then the plug 2 secured in the tubular handle 1.

A slight variation of the construction of the holder is shown in Figs. 11 to 14 inclusive, by means of which it is adaptable to the holding of a wide variety of implements or tools of which a screw driver will serve as an example and which are purposely constructed to fit the holder.

In this type of implement, such as the screw driver 20 illustrated, the end is provided with a flat shoulder 21 to seat firmly against the end of the plug 22 of the holder and with a projection fitting in the bore of the plug. This projection preferably presents a section 23 extending from the flat face 21 and snugly fitting the bore of the plug, and then a flat plate-like projection 24 adapted to seat against the flat face of the shank of the hook and provided with a hole 25 to be engaged by the hook.

The bore of the plug may be of various shapes and preferably the outer end is of square cross section 26 as shown in Fig. 13, and the section 23 of the tool is of square cross section to fit therein, while the inner end of the bore is of semi-circular cross section 27 as shown in Fig. 14 to fit the semi-circular shank portion such as 160 of the hook.

The operation of the device is the same as that already described except that in this case the hook, when in locking position, is entirely within the bore of the plug of the handle, and holding the tool firmly seated against the end of the plug.

There is thus presented a very simple and efficient construction of a holder adaptable to a wide variety of implements and by means of which any desired one of the said implements may be readily secured in place to the handle, held in position by the expanding spring, and firmly locked in position by screwing up the sleeve until it abuts the end of the tubular handle.

Having thus described the invention, what is claimed as new, and desired to be secured by Letters Patent, is

1. A holder adapted to hold any one of a variety of implements comprising a tubular handle; a sleeve telescoping and rotative in the handle, having a threaded bore and a closed end to extend over and abut the end of the handle; a closure for the other end of the handle having a bore therethrough; a plunger having a semi-cylindrical shank portion with a hook at its end to extend through the closure and a threaded shank portion co-operating with the threaded bore of the sleeve; and an expansion spring in the handle expanding between the closure and the sleeve, whereby the implement may be yieldingly held and positioned between the hook and the closure by the expanding spring with the plunger and sleeve extended and may then be rigidly locked in position by screwing in the sleeve until its end abuts the handle.

2. A holder as defined in claim 1 in which the closure is provided with a transverse groove in its face forming a seat for the end of the implement.

3. A holder as defined in claim 1 in which the closure is provided with a transverse groove in its face forming a seat for the end of the implement and in which the face of the hook and the face of the groove extend from the flat face of the plunger beveled toward each other and thus act to force and secure the implement against the flat face of the plunger.

4. A holder having the construction defined in claim 1 in which the closure is provided with a transverse groove in its face forming a seat for the end of the implement, and in which the face of the groove extends in an outward bevel from the flat face of the plunger and is formed on an inset secured in the end of the closure.

5. A holder having the construction defined in claim 1 in which the closure is provided with a transverse groove in its face forming a seat for the end of the implement, and in which the face of the groove extends in an outward bevel from the flat face of the plunger and is formed on an inset secured in the end of the closure, and in which the semi-cylindrical shank portion of the plunger is a separate part secured to the threaded shank portion.

6. The combination with a holder as defined in claim 1 of an implement having a shoulder to fit against the end of the closure and an apertured projection to extend within the bore of the closure for engagement with the hook.

7. The combination with a holder as defined in claim 1 and in which the outer end of the bore of the closure is of polygonal cross section, of an implement having a shoulder to fit against the end of the closure and a projection of polygonal cross section corresponding to that of the end of the bore and terminating in a flat projection seating against the flat face of the plunger and provided with a hole engaged by the hook.

GEORGE P. HEIGLE.

REFERENCES CITED

The following references are of record in the file of this patent:

UNITED STATES PATENTS

| Number | Name | Date |
| --- | --- | --- |
| 220,933 | McGill | Oct. 28, 1879 |
| 993,100 | Powers | May 23, 1911 |
| 987,173 | Sale | Mar. 21, 1911 |
| 1,420,342 | Richard | June 20, 1922 |
| 1,989,225 | Campbell | Jan. 29, 1935 |
| 2,109,108 | Fesler | Feb. 22, 1933 |
| 2,389,372 | Lea | Nov. 20, 1945 |